US008482521B2

(12) United States Patent
Abe et al.

(10) Patent No.: US 8,482,521 B2
(45) Date of Patent: Jul. 9, 2013

(54) POINTER CONTROLLING APPARATUS

(75) Inventors: Koichi Abe, Tokyo (JP); Shogo Tsubouchi, Tokyo (JP)

(73) Assignee: GVBB Holdings S.a.r.l., Luxembourg (LU)

( * ) Notice: Subject to any disclaimer, the term of this patent is extended or adjusted under 35 U.S.C. 154(b) by 405 days.

(21) Appl. No.: 12/733,874

(22) PCT Filed: Oct. 5, 2007

(86) PCT No.: PCT/JP2007/001089
§ 371 (c)(1),
(2), (4) Date: Mar. 25, 2010

(87) PCT Pub. No.: WO2009/044432
PCT Pub. Date: Apr. 9, 2009

(65) Prior Publication Data
US 2010/0309122 A1    Dec. 9, 2010

(51) Int. Cl.
*G09G 5/00*    (2006.01)

(52) U.S. Cl.
USPC ........... 345/156; 345/157; 345/160; 345/163; 345/169; 715/856; 715/858

(58) Field of Classification Search
USPC ... 345/156, 157, 159, 160, 163; 715/856–858
See application file for complete search history.

(56) References Cited

U.S. PATENT DOCUMENTS

| | | | | | |
|---|---|---|---|---|---|
| 5,786,805 | A | * | 7/1998 | Barry | 345/159 |
| 5,870,079 | A | * | 2/1999 | Hennessy | 345/159 |
| 6,137,487 | A | * | 10/2000 | Mantha | 715/767 |
| 2002/0003529 | A1 | * | 1/2002 | Takase et al. | 345/159 |

FOREIGN PATENT DOCUMENTS

| | | |
|---|---|---|
| EP | 0665489 | 8/1995 |
| JP | 1996152971 A | 6/1996 |
| JP | 1997026850 A | 1/1997 |
| JP | 1998198520 A | 7/1998 |
| JP | 1998222307 A | 8/1998 |
| JP | 1999045156 A | 2/1999 |
| JP | 2000020243 A | 1/2000 |
| JP | 2000039966 A | 2/2000 |
| JP | 2006521611 A | 9/2006 |
| JP | 2007220079 A | 8/2007 |
| WO | WO 96/35161 | 11/1996 |

OTHER PUBLICATIONS

European Patent Office, Examination Report for the European Patent Application No. 07827868.6 dated Sep. 14, 2011.
Summons to Attend Oral Proceedings Pursuant to Rule 115(1) EPC dated Feb. 15, 2012 in European Patent Application No. 07827868.6.
Search Report Dated Jun. 23, 2008.
First Office Action for Japanese Patent Application No. 2010-513512 issued by the JPO on May 15, 2012.
Second Office Action for Japanese Patent Application No. 2010-513512 issued by the JPO on Sep. 25, 2012.
First Office Action for Chinese Patent Application No. 200780100972.6 issued by the SIPO on Dec. 23, 2011.
Second Office Action for Chinese Patent Application No. 200780100972.6 issued by the SIPO on Sep. 18, 2012.

* cited by examiner

*Primary Examiner* — Quan-Zhen Wang
*Assistant Examiner* — Jennifer Nguyen
(74) *Attorney, Agent, or Firm* — Arent Fox LLP

(57) ABSTRACT

The present invention provides an apparatus, a controlling method, and a controlling program for appropriately moving a pointer to a selection position regardless of alignment and size of function selection area, and improving operability and certainty of function selection in a GUI. The apparatus includes (1) means for determining whether or not the pointer has crossed over a boundary of a predetermined area from outside to inside based on position information of the pointer; (2) means for determining a speed of the pointer or whether or not an event has occurred, and setting two types of operating modes; (3) means for moving the pointer to a predetermined position within the area when the pointer has crossed over the boundary from outside to inside; and (4) means for changing a moving distance of the pointer, if the pointer moves at a speed less than a predetermined moving speed or the event has not occurred and when it is determined that the pointer exists within the area, based on the speed determined when the pointer existed outside the area.

10 Claims, 10 Drawing Sheets

400

500

POINTER CONTROLLING APPARATUS

This application claims the benefit, under 35 U.S.C. §365 of International Application PCT/JP2007/001089, filed Oct. 5, 2007, which was published in accordance with PCT Article 21(2) on Apr. 9, 2009 in English.

TECHNICAL FIELD

The present invention relates to a controlling apparatus and a method for controlling a graphical user interface (GUI) which includes a pointing device such as a mouse. In particular, the present invention relates to a pointer controlling apparatus and a method for changing a moving speed of a pointer between inside and outside a selected area on a display screen indicated by the pointing device in order to improve GUI operability.

BACKGROUND ART

A method of controlling a pointing device such as a mouse, selecting an area with program functions that are indicated by buttons, a slide bar, or the like, and implementing the functions provided to the area (hereafter referred to as 'selection area') has been implemented by various user-friendly controlling apparatuses and methods using generally called GUI. With the GUI, in order to select an area such as a button, and implement a function provided to the area, a user must move a pointer of a pointing device such as a mouse into the area, and ensure selection of the area.

At this time, a position determining means for determining that a pointer such as a cursor exists within the area is essential. Such position determining means is a well-known technology, and is used on GUI software such as Windows (registered trademark), Mac OS (registered trademark), and the like.

If the pointer exists within the selection area, it is preferred that the pointer can select not the boundary of the area but the center thereof with certainty in order to ensure selection of the area and prevent erroneous operation. For example, users may select the center of the selection area with certainty by automatically moving the pointer to an area adjacent to the center of the area when the pointer has crossed over a boundary of the area from outside to inside. A technology to automatically move a pointer to a central coordinate position is disclosed in Japanese Unexamined Patent Application Publication No. H8-152971, and has already been put into practical use as a software keyboard.

Further, there are other methods of ensuring selection of the selection area to prevent erroneous operation. For example, there is a method of making the moving speed of the pointer displayed on the screen slower than the usual movement speed of the pointing device when a pointer exists within the area, or fixing the pointer displayed on the screen until the pointing device moves a predetermined distance or greater. Such technology is disclosed in Japanese Unexamined Patent Application Publication No. H10-133822. This method allows prevention of erroneous operation and selection of a desired area with certainty because the pointer does not move outside of the selection area due to shaking of hands, clicking, or the like as long as the pointing device on hand does not move widely.

There are many screen inputting apparatuses to which GUI is applied. For example, conventionally, in an image editing field, images have been edited using a video playback and storing apparatus and a video editing apparatus. However, advancement of computer technology allows implementation of editing on an editing screen by selecting a function select button or the like provided on the same screen while checking an image being edited. FIG. 1 is a block diagram showing a display system which implements the video editing on a computer display. According to the display system shown in the drawing, an image filmed by a video camera or the like (not shown in the drawing) is stored in an image storing means 110. Operators may edit video images using an editing computer 180 and an edit controlling means 130 while viewing them on an image displaying means 120. The edited images may be output from the image storing means 110 using an appropriate method.

FIG. 2 shows an example of an editing screen in the image editing field described above. In FIG. 2, GUI technology is applied for the selection of input/output channels (240), setting for selection and duration (230) of editing images, and the like. In addition, to implement detailed editing operations using an editing means on a computer screen, it is necessary to display many selection areas for implementing GUI functions, such as buttons, slide bars, and the like on the screen as illustrated in FIG. 2.

FIG. 3 is a diagram showing exemplary buttons displayed on an actual editing screen. When many selection areas are provided, the smaller a button-shape selection area, the more the amount of information to be provided on the screen increases. However, it becomes difficult to ensure that the pointer moves into an area to select a function provided to the area due to a decrease in selection area size, resulting in a deterioration of operability.

FIG. 4 shows an example where many selection areas are provided in multiple rows and columns in order to compensate for the deterioration of operability due to the decrease in selection area size as described above. FIG. 4 shows an example of two rows×two columns. In such a screen including many selection areas, a problem of operability develops when attempting to select a first area by passing over a second selection area. For example, when the technology disclosed in the aforementioned Japanese Unexamined Patent Application Publication No. H10-133822 is used, a decrease in moving speed and suspension is repeated when moving a pointer to the center of the selection area and moving it within the selection area for each selection area along a pointer passing route. Accordingly, it takes time to reach a target selection area, resulting in an extreme deterioration of operability. In addition, a method of expanding an area when a pointer of a pointing device enters within the area has been proposed in attempt to improve certainty of function selection; however, this method has a disadvantage that the expanded area covers other areas and other displaying units.

DISCLOSURE OF INVENTION

Problems to be Solved by the Invention

As described above, it is difficult for the conventional methods to simultaneously meet demands of increase in the number of selection areas displayed on a screen per area, obtained by reducing the size of the selection area, and increase in accuracy when selecting a desired area using a pointer.

Therefore, in order to solve the aforementioned problems, the present invention aims to provide a pointer controlling apparatus and a method which deploys a pointer at an appropriate selection position without decreasing operability by detecting and controlling position and moving distance of the pointer in given period when a pointing device is moved regardless of alignment and size of selection area.

Means for Solving the Problems

In order to solve the above-described problems, the present invention includes: a means for receiving position information of a pointer and determining whether or not the pointer has crossed over a boundary of a predetermined area from outside to inside; a means for determining change in position information of the pointer per unit time (moving speed) or whether or not an event such as a mouse click or the like has occurred, and setting two types of operating modes; a means for moving the pointer to a predetermined position within the predetermined area when the pointer has crossed over the boundary of the area from outside to inside; and a means for changing a moving distance of the pointer, if the pointer moves at a speed less than a predetermined moving speed or the event has not occurred and when it is determined that the pointer exists within the predetermined area, based on the change in the position information of the pointer per unit time determined when the pointer existed outside the predetermined area. It should be noted that the "moving distance" is sometimes defined for brevity as the distance in given period that the pointer is to be moved.

The present invention will be described in further detail below.

The determining means of the present invention receives position information of a pointer such as X and Y coordinates on a display screen, and determines whether or not the pointer has crossed over a boundary of a predetermined area from outside to inside based on position information of the boundary and information on change in the position of the pointer. Further, when the pointer has crossed over a boundary of the predetermined area from outside to inside, display of the area may be emphasized. For example, shape of the selection area may be changed (e.g., displays to indicate that a button is pressed), color or design may be changed, or the like.

A means for determining moving speed of a pointer or whether or not an event has occurred, and setting two types of operating modes sets a first control mode when the change in the pointers position information per unit time is less than a predetermined value and a predetermined event has not occurred, and sets a second control mode when the mount of change exceeds or equals a predetermined value or a predetermined event has occurred. Here, the predetermined value, which may be a value preset by a user, may be continuously used, or may be changed according to size, amount, alignment of an area having a selection function such as a button displayed on a screen, or a request by an operator.

The predetermined event is a clicking or a dragging operation of a mouse, for example, and may occur by an input operation using a button, a wheel, or the like provided on the pointing device, or combination of input operations of the pointing device and a key on an input device such as a keyboard and the like. In the first control mode, when it is determined that the pointer exists within the predetermined area, the moving distance of the pointer relative to the change in pointer position information per unit time is changed from the moving distance when the pointer exists outside the predetermined area. In the second control mode, the moving distance of the pointer relative to the change in the pointer position information per unit time is not changed regardless of being inside or outside the predetermined area.

In the first control mode and when the pointer has crossed over the boundary of the predetermined area from outside to inside, means for moving the pointer to a predetermined position within the selection area automatically moves the pointer to the predetermined position within the selection area based on the result determined by a determining means for determining the predetermined position. The predetermined position within the selection area is position information automatically calculated from the position information such as coordinate position information and the like pre-input by a user, and desirably it is a center within the selection area, however, if the center cannot be identified due to the shape of the selection area, an appropriate position may be defined according to on-demand operation. In addition, for example, if functions (e.g., icons such as copy, paste, and the like) provided to the selection area are hidden due to movement of the pointer to the center of the selection area, a position which does not visually intercept the selection area may be intentionally specified in advance.

In the first control mode, when the pointer moves closer to the center of the predetermined area, the moving distance of the pointer relative to the change in the pointer position information per unit time may increase compared to that when the pointer exists outside the predetermined area. In addition, when the pointer moves away from the center of the predetermined area, the moving distance of the pointer relative to the change in the pointer position information per unit time may be decreased compared to that when the pointer exists outside the predetermined area. Further, when the pointer moves away from the center of the selection area, movement of the pointer may be suspended for a predetermined duration even if change in the pointer position information per unit time occurs. Such behaviors of the pointer movement in the first control mode may be set or changed according to a request of a user.

Another aspect of the present invention provides a controlling method and a controlling program comprising one or more processing steps, each corresponding to the aforementioned means.

EXPLANATION OF THE REFERENCE NUMERALS

110 Image Storing Means
120 Image Displaying Means
130 Edit Controlling Means
180 Editing Computer
610 Pointer Controlling Apparatus
620 Pointer Position Determining Means
630 First/Second Control Mode Setting Means
640 Pointer Moving Means
650 Pointer Moving Distance Changing Means
660 Storing Apparatus

DETAILED DESCRIPTION

Preferred embodiments of the present invention will be described below with reference to the accompanying drawings.

Figure 1:
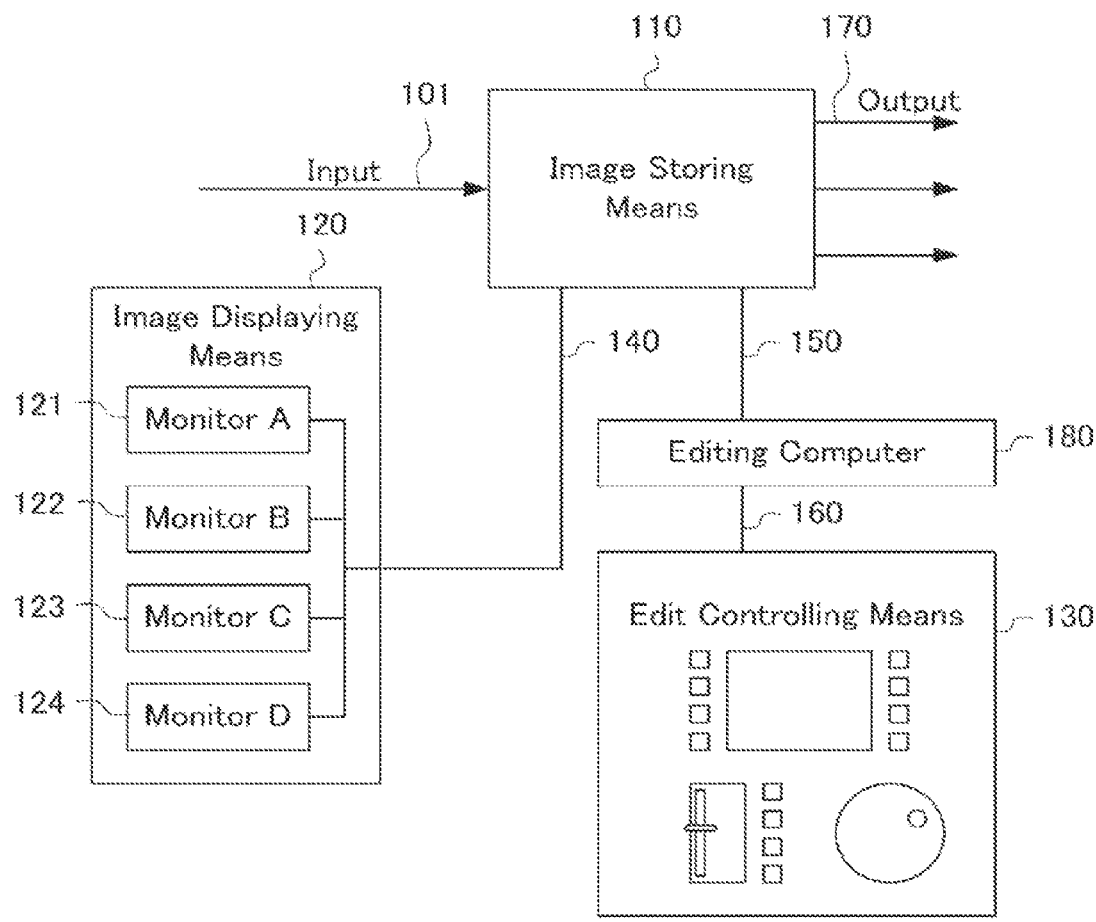
FIG. 1 is a block diagram showing a display system which implements video editing on a computer display.
Figure 2:
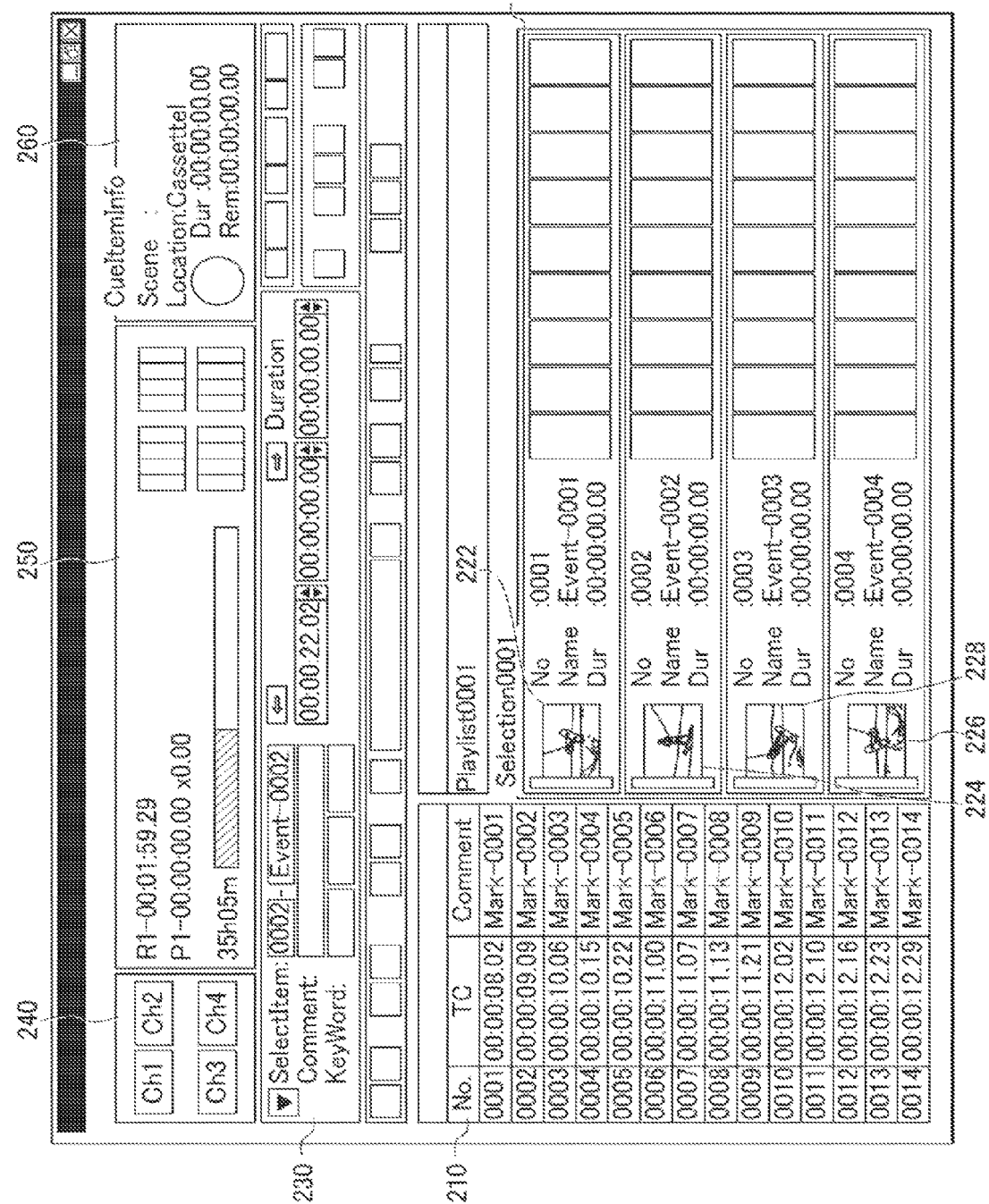
FIG. 2 is a diagram showing an exemplary editing screen in an image editing field.
Figure 3:
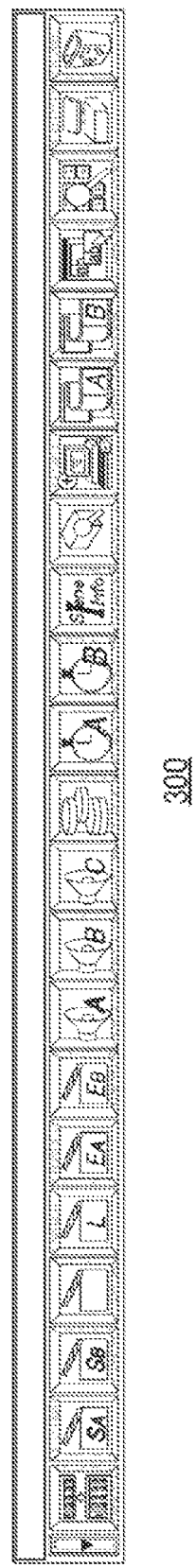
FIG. 3 is a diagram showing exemplary buttons displayed on an actual editing screen.
Figure 4:
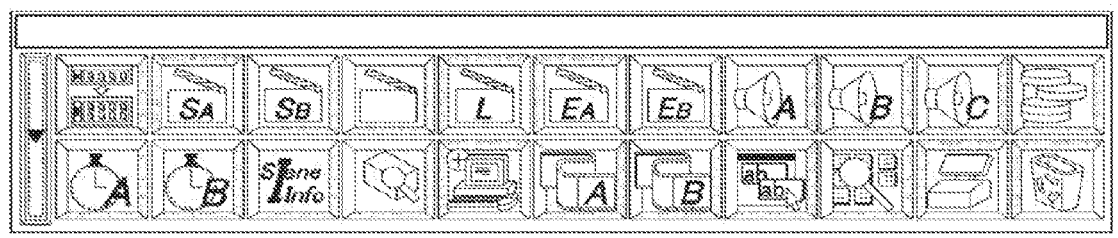
FIG. 4 is a diagram showing a display example when a selection area covers multiple rows and columns.
Figure 5:
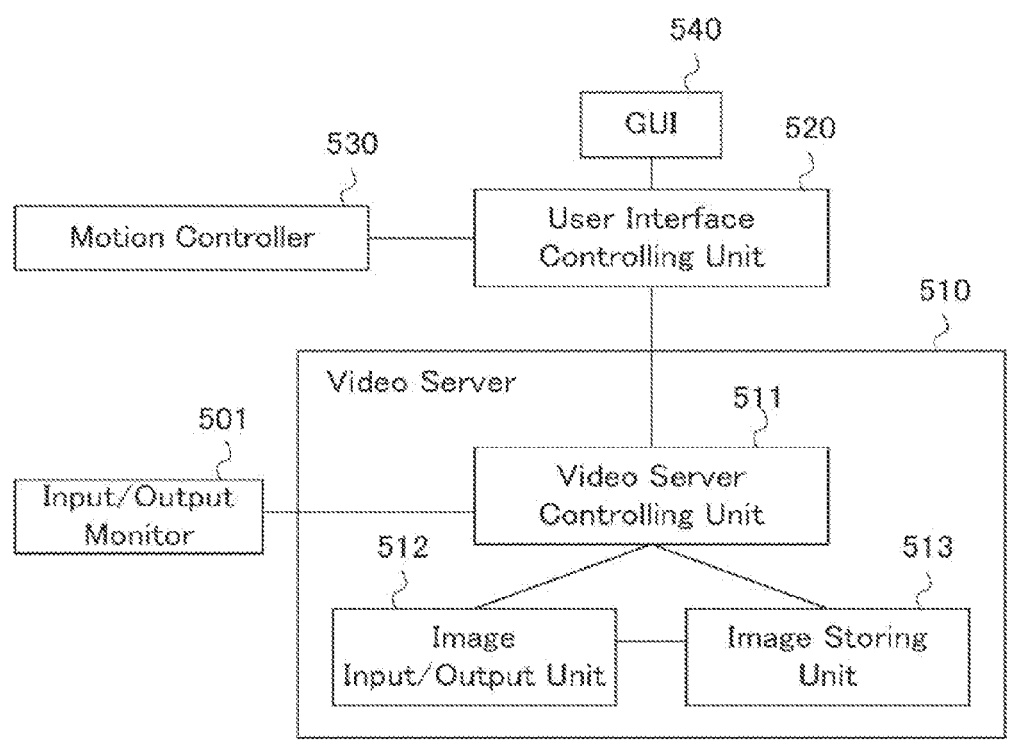
FIG. 5 is a functional block diagram explaining a first embodiment of the pointer controlling apparatus of the present invention.

FIG. 5 is a functional block diagram explaining a first embodiment of the pointer controlling apparatus of the present invention When a pointer controlling apparatus of the present invention is applied to a video image editing system, it is configured with an input/output monitor 501, a video server 510, a user interface controlling unit 520, a motion controller 530, and a GUI (graphical user interface) 540.

The input/output monitor 501 is adapted to output images being stored or images and audio signals being edited in the video server 510.

The user interface controlling unit 520 is adapted to control operating instructions input from the motion controller 530 and the GUI 540 and carry out editing operations on a computer display in combination with the video server 510. The user interface controlling unit 520 includes a pointer controlling apparatus 610 according to the present invention.

The motion controller 530 is adapted to output necessary images and audio signals to the user interface controlling unit 520 in response to instructions required for editing images input by an operator.

The GUI (graphical user interface) 540 is adapted to provide the operator with various operating instructions in an easy-to-operate form such as, for example, an icon for the operator to specify and output instructions to the user interface controlling unit 520.

A video server controlling unit 511 is adapted to execute the instructions supplied from the user interface controlling unit 520 in combination with an image input/output unit 512 and an image storing unit 513, and output images and audio signals to the input/output monitor 501.

The image input/output unit 512 is adapted to control input/output images and audio signals based on the instructions supplied from the user interface controlling unit 520 in combination with the video server controlling unit 511.

The image storing unit 513 is adapted to control input images and audio signals based on the instructions supplied from the user interface controlling unit 520 in combination with the video server controlling unit 511.

Figure 6:
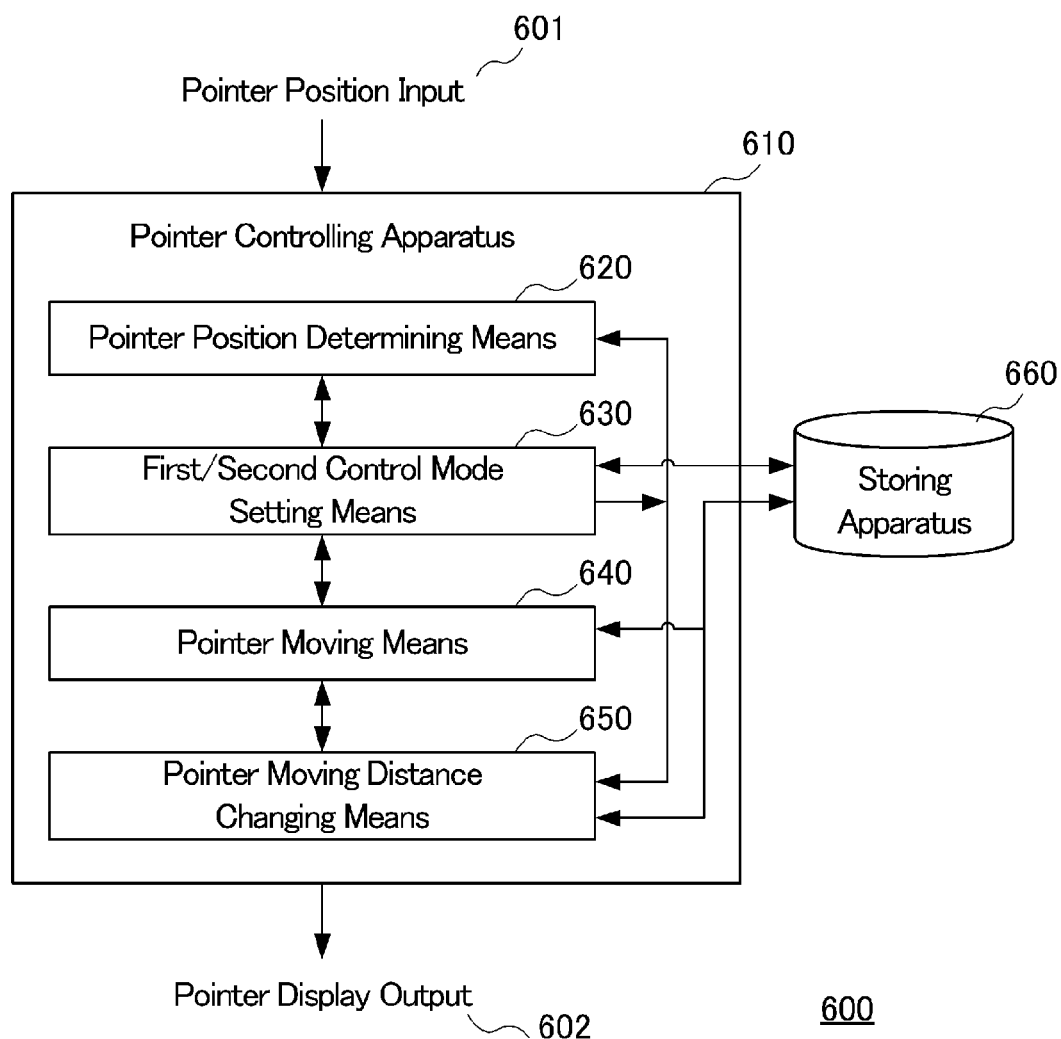
FIG. 6 is a functional block diagram explaining the first embodiment of the pointer controlling apparatus of the present invention applied to the user interface controlling unit shown in FIG. 5.

FIG. 6 is a functional block diagram showing the first embodiment of the pointer controlling apparatus 610 in an example where the pointer controlling apparatus 610 of the present invention is applied to the user interface controlling unit 520 of FIG. 5.

When receiving a pointer position, a pointer position determining means 620 determines whether or not the pointer has crossed over a boundary of a predetermined area from outside to inside, and transmits a determination result to a first/second control mode setting means 630 and a pointer moving distance changing means 650.

The first/second control mode setting means 630 determines a moving distance of a pointer per unit time or whether or not an event of the pointer has occurred, and checks with conditions stored in a storing apparatus 660, thereby setting a first or a second control mode. Here, conditions stored in the storing apparatus 660 are conditions for setting the first control mode or the second control mode, for example, the moving distance of the pointer per unit time, whether or not an event of a pointer has occurred, and the like. When the first control mode is set, the first/second control mode setting means 630 instructs the pointer moving distance changing means 650 to change the moving distance of the pointer per unit time. When the second control mode is set, the first/second control mode setting means 630 instructs a pointer moving means 640 to move and output a pointer display.

When the first control mode is set, the pointer moving distance changing means 650 instructs the pointer moving means 640 to move the pointer to a predetermined position within a predetermined area based on information such as shape, size, and the like of a selection area read from the storing apparatus 660.

The pointer moving means 640 moves and outputs a pointer display based on instructions supplied from the first/second control mode setting means 630 or the pointer moving distance changing means 650.

The storing apparatus 660 is stored with conditions for setting the first or the second control mode. In addition, programs, data, and the like related to functions given to respective selection areas, such as copying function, pasting function, and the like are stored in addition to information on shape, size, and the like of the selection areas such as various buttons and the like on the GUI. Programs configured with a series of instructions to activate a controlling apparatus according to the present invention, and data which is created or edited using the controlling apparatus may also be stored.

Figure 7:
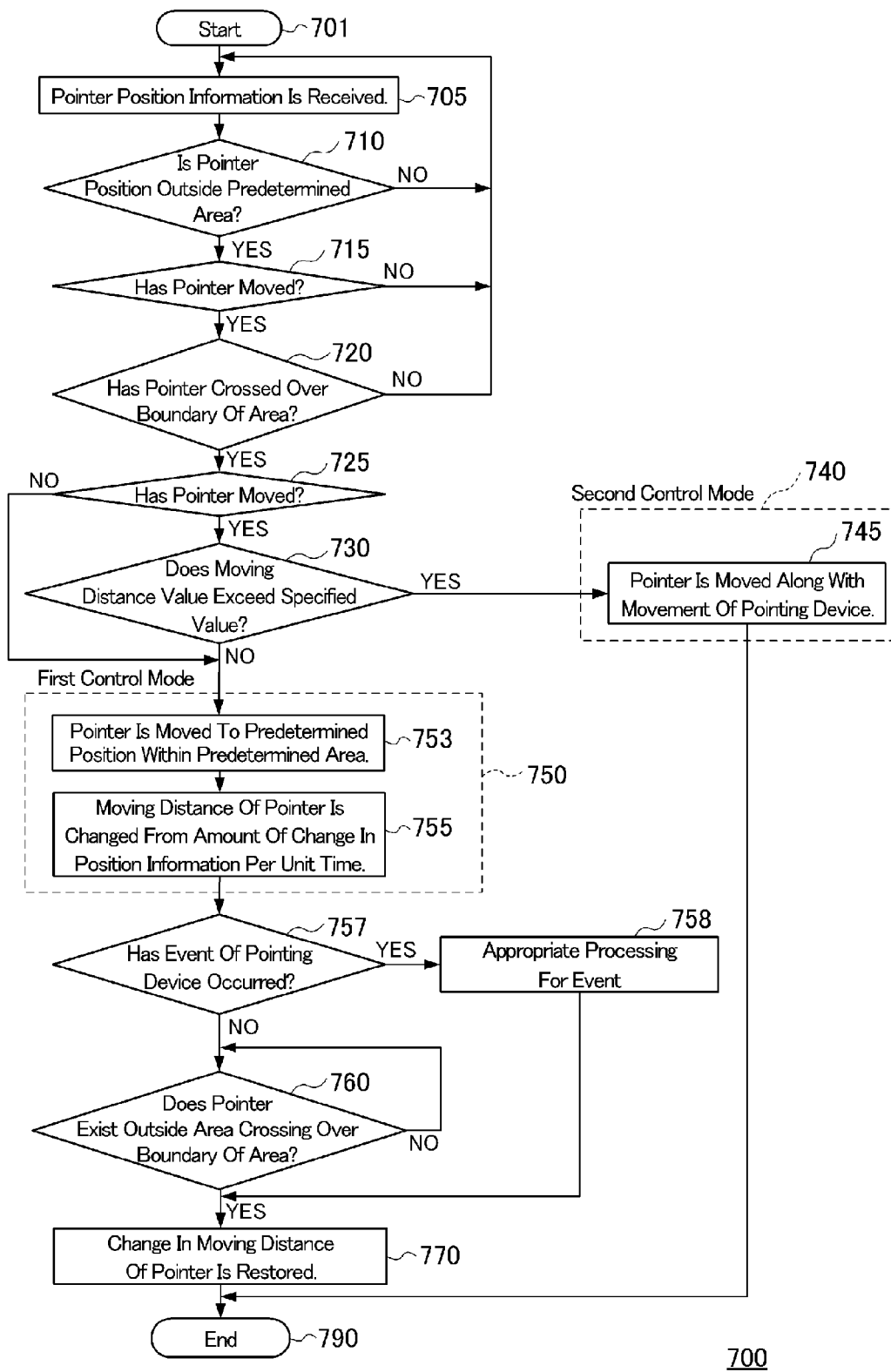
FIG. 7 is a flowchart explaining the first embodiment of the present invention carried out by the pointer controlling apparatus shown in FIG. 6.

FIG. 7 is a flowchart of processing by a pointing device according to the first embodiment of the present invention. In this example, when a pointer exists within a predetermined area, and a moving distance per unit time is less than a specified value, the first control mode is set; whereas when the moving distance per unit time is greater than or equal to the specified value, the second control mode is set.

First, in step 705, the pointer controlling apparatus 610 receives pointer position information, and processing proceeds to step 710.

In step 710, the pointer controlling apparatus 610 determines whether or not the pointer position is outside the predetermined area based on the pointer position information received in step 705. If the pointer position is outside the area (Y), processing proceeds to step 715; if the pointer position is not outside the area (N), processing proceeds to step 705.

In step 715, the pointer controlling apparatus 610 determines whether or not the pointer moves. If pointer movement is recognized (Y), processing proceeds to step 720; if pointer movement is not recognized (N), processing proceeds to step 705.

In step 720, the pointer controlling apparatus 610 determines whether or not the pointer has crossed over a boundary of the area. If the pointer has crossed over the boundary of the area (Y), processing proceeds to step 725; if the pointer has not crossed over the boundary of the area (N), processing proceeds to step 705.

In step 725, the pointer controlling apparatus 610 determines whether or not the pointer moves. If the pointer movement is recognized (Y), processing proceeds to step 730; if the pointer movement is not recognized (N), processing proceeds to step 753 in the first control mode 750.

In step 730, the pointer controlling apparatus 610 compares a moving distance per unit time of the pointer caused by the movement of the pointing device to a specified value. If the moving distance per unit time exceeds or equals the specified value (Y), processing proceeds to step 745 in the second control mode 740; if the distance value is less than the specified value (N), processing proceeds to step 753 in the first control mode 750. Here, the specified value is a distance value of a pointer per unit time and may be arbitrarily set according to application and form of a displaying screen, for example, 600 through 700 pixels per second if resolution of the screen is 1280×1024 pixels.

In step 745, the pointer controlling apparatus 610 moves the pointer without changing the moving distance of the pointer per unit time, and processing proceeds to step 790 and ends.

In step 753, the pointer controlling apparatus 610 automatically moves the pointer to a predetermined position within the predetermined area, and processing proceeds to step 755.

In step 755, the pointer controlling apparatus 610 changes the distance to move the pointer from the change in the pointer position information per unit time, and processing proceeds to step 757. Here, the change in the distance to move the pointer may be arbitrarily set based on application and form of display screen, size of predetermined area, and the like; however, it is preferred that relationship of the moving distance of the pointer per unit time to a physical moving distance of the pointing device is set to 20 to 30% before changing.

In step 757, the pointer controlling apparatus 610 detects whether or not an event of the pointing device has occurred. If an event of the pointing device has occurred (Y), processing proceeds to step 758; if an event of the pointing device has not occurred (N), processing proceeds to step 760.

In step 758, the pointer controlling apparatus 610 performs appropriate processing for the event of the pointing device, and processing proceeds to step 770.

In step 760, the pointer controlling apparatus 610 determines whether or not the pointer has crossed over the area boundary and exists outside the area. If the pointer exists outside the area (Y), processing proceeds to step 770. If the pointer is not outside the area, processing proceeds to step 760 again.

In step 770, the pointer controlling apparatus 610 restores the change in the moving distance of the pointer per unit time, processing proceeds to step 790 and ends.

Figure 8:
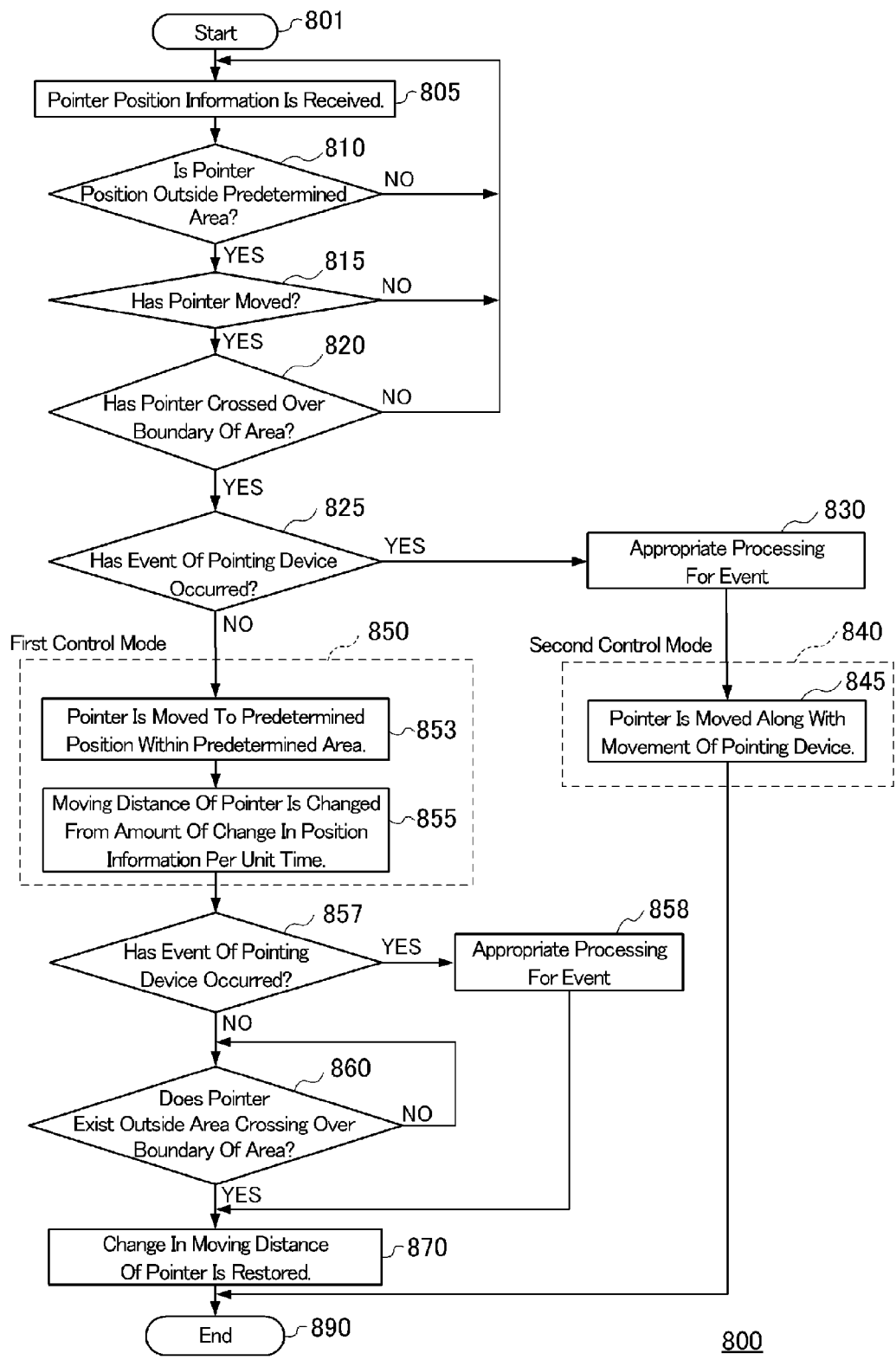
FIG. 8 is a flowchart explaining a second embodiment of the present invention carried out by the pointer controlling apparatus shown in FIG. 6.

FIG. 8 is a flowchart of processing by a pointing device according to a second embodiment of the present invention. In this example, when a pointer exists within a predetermined area, and an event of the pointing device has occurred, the second control mode is set; whereas when no events occur, the first control mode is set. In addition, the processing according to this example is especially effective when the size of the selection area is small. The smaller the size of the selection area, the shorter the duration from when the pointer enters the selection area to when the first control mode is determined. This increases opportunity for the first control mode to be set, with no event occurrence.

The processing procedures in FIG. 8 are the same as those in FIG. 7 described above except for processing in steps 825 and 830. Therefore, the processing procedures in steps 825 and 830 are described below.

In step 825, the pointer controlling apparatus 610 determines whether or not an event of the pointing device has occurred. If an event of the pointing device has occurred (Y), processing proceeds to step 830; if an event of the pointing device has not occurred (N), processing proceeds to step 853 in the first control mode 850.

In step 830, the pointer controlling apparatus 610 performs appropriate processing for the event of the pointing device, and processing proceeds to step 845 in the second control mode 840.

As described above, the pointer may be moved quickly by moving the pointing device at a speed faster than or equal to the specified value or by carrying out an event such as clicking. In particular, in the case where many selection areas are provided over several rows and columns, smooth and reliable pointer operation is possible without being concerned about deterioration of operability due to decrease in movement of the pointer to the center of the selection area and decrease in the moving distance within the selection area for each selection area along a pointer passing route.

Example 1

Figure 9:
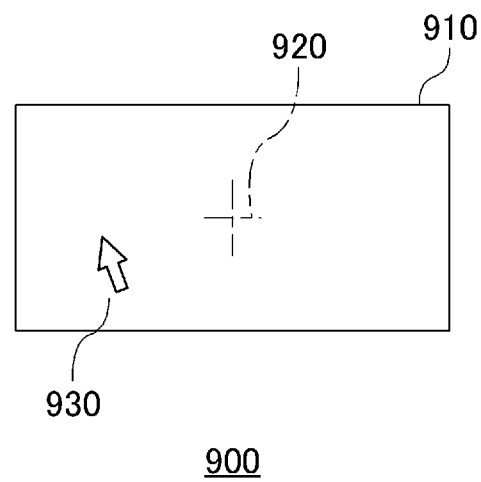
FIG. 9 is a diagram showing a display example of the first embodiment of the present invention carried out by the pointer controlling apparatus shown in FIG. 6.

An example of a screen display according to the first embodiment of the present invention is described below. FIG. 9 shows a pointer 930 existing within a selection area 910. Here, a point 920 is the center of the selection area 910.

Figure 10:
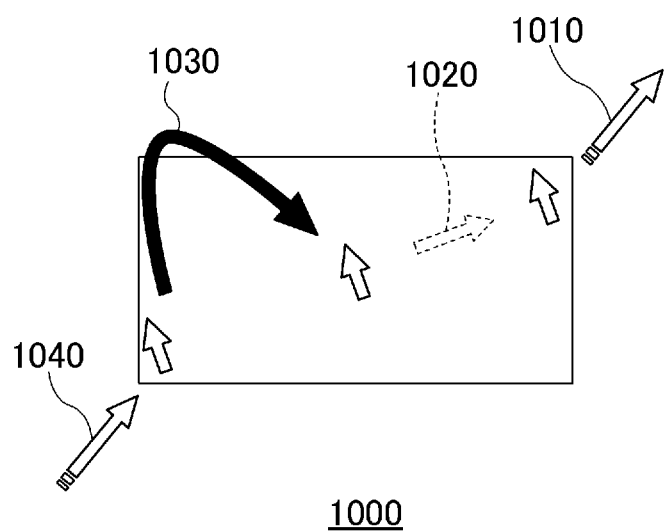
FIG. 10 is a diagram showing a display example of the first embodiment of the present invention carried out by the pointer controlling apparatus shown in FIG. 6.

FIG. 10 shows behavior of pointer display according to the first embodiment. It is assumed that the pointer moves at a moving distance per certain unit time (hereafter also referred to as 'moving speed' or 'speed') indicated by an arrow 1040 outside the selection area. When the pointer has crossed over the boundary of the selection area from outside to inside, the first control mode is set, and the pointer moves to the center of the selection area as shown by an arrow 1030 if speed indicated by the arrow 1040 is less than a predetermined value. Here, the arrow 1030 indicates the state of the pointer moving to the center of the selection area as if it jumps. An arrow 1020, which indicates a speed of the pointer moving within the selection area starting from the center of the selection area, shows an example where the moving speed of the pointer on the screen is slower than the actual moving speed of the pointing device. In other words, even when the pointing device is moved at the same speed as that indicated by the arrow 1040, it shows that the pointer speed, that is, the moving distance of the pointer relative to the change in the position information per unit time measured when the pointing device is actually moved changes from the moving distance relative to the change in the position information per unit time measured when the pointer is outside the predetermined area, resulting in a slower moving speed of the pointer. If the pointer crosses from inside the selection area to outside, the first control mode is cancelled and the pointer moves at a speed indicated by an arrow 1010 without any change in speed. In addition, if the speed indicated by the arrow 1040 exceeds or equals the predetermined value, the second control mode is set and the pointer speed does not change.

Behavior in the case of FIG. 10 where a pointer exists within a selection area and a predetermined event such as clicking, dragging, or the like has occurred is described below. When the predetermined event has occurred, appropriate processing for the event is performed and the second control mode is set. The behavior of the pointer in the second control mode is as described above and the pointer speed does not change.

Example 2

Figure 11:
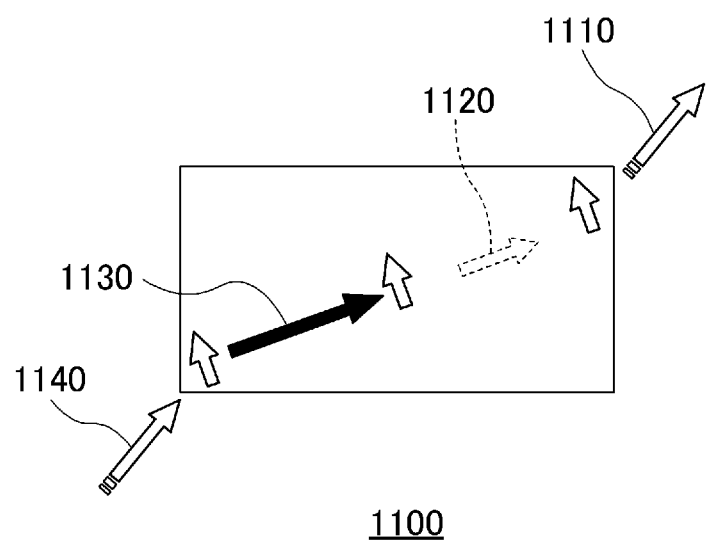
FIG. 11 is a diagram showing a display example of the second embodiment of the present invention carried out by the pointer controlling apparatus shown in FIG. 6.

An example of a screen display according to the second embodiment of the present invention is described below. FIG. 11 shows a pointer moving at a certain speed indicated by an arrow 1140 outside a selection area. When the pointer has crossed over the boundary of the selection area from outside to inside, the first control mode is set if speed indicated by the arrow 1140 is less than a predetermined value. Further, it shows that if the pointer moves closer to the center of the selection area, the pointer moves at a speed indicated by an arrow 1130, increasing the pointer speed relative to the change in pointer position information per unit time compared to that when the pointer exists outside the predetermined area. An arrow 1120, which indicates speed when the pointer moves away from the center of the selection area within the selection area crossing over the center of the selection area, shows that a speed of the pointer is slower than a speed when the pointer exists outside the predetermined area even when the pointing device is moved at the same speed as that indicated by the arrow 1140. If the pointer crosses from inside the selection area to outside, the first control mode is cancelled and the pointer moves at a speed indicated by an arrow 1110 without any change in speed. In addition, if the speed indicated by the arrow 1140 exceeds or equals the predetermined value, the second control mode is set and the pointer speed does not change.

Behavior in the case of FIG. 11 where a pointer exists within a selection area and a predetermined event such as clicking, dragging, or the like has occurred is described below. When the predetermined event has occurred, appropriate processing for the event is performed and the second control mode is set. The behavior of the pointer in the second control mode is as described above and the pointer speed does not change.

Example 3

Figure 12:
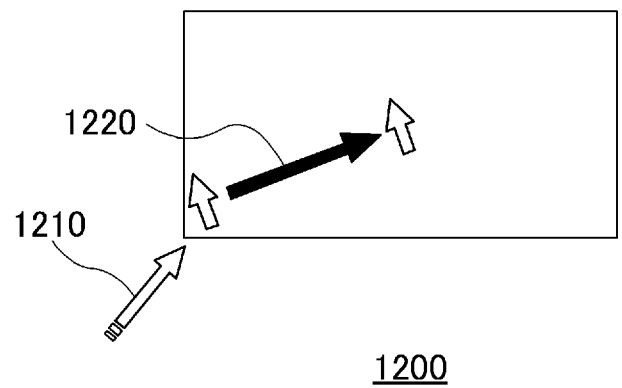
FIG. 12 is a diagram showing a display example of the second embodiment of the present invention carried out by the pointer controlling apparatus shown in FIG. 6.

An example of a screen display according to a third embodiment of the present invention is described below. FIG. 12 shows a pointer moving at a certain speed indicated by an arrow 1210 outside a selection area. When the pointer has crossed over the boundary of the selection area from outside to inside, the first control mode is set if a speed indicated by the arrow 1210 is less than a predetermined value. Further, it shows that if the pointer moves closer to the center of the selection area, the pointer moves at a speed indicated by an arrow 1220, increasing the pointer speed. If the pointer crosses over the center of the selection area and moves away from the center of the selection area, movement of the pointer is suspended for a predetermined duration even if change in pointer position information per unit time occurs. It is possible to allow users to select the selection area by implementing event operations such as clicking, dragging, and the like while the movement of the pointer is suspended. In this case, the speed of the pointer may further increase or decrease compared to the speed when the pointer is outside the predetermined area, and is set according to the required operability. If the pointer crosses from inside the selection area to outside, the first control mode is cancelled and the pointer moves without any change in speed. In addition, if the speed indicated by the arrow 1210 exceeds or equals the predetermined value, the second control mode is set and the pointer speed does not change.

Behavior in the case of FIG. 12 where a pointer exists within a selection area and a predetermined event such as clicking, dragging, or the like has occurred is described below. When the predetermined event has occurred, appropriate processing for the event is performed and the second control mode is set. The behavior of the pointer in the second control mode is as described above and the pointer speed does not change.

Example 4

Figure 13:
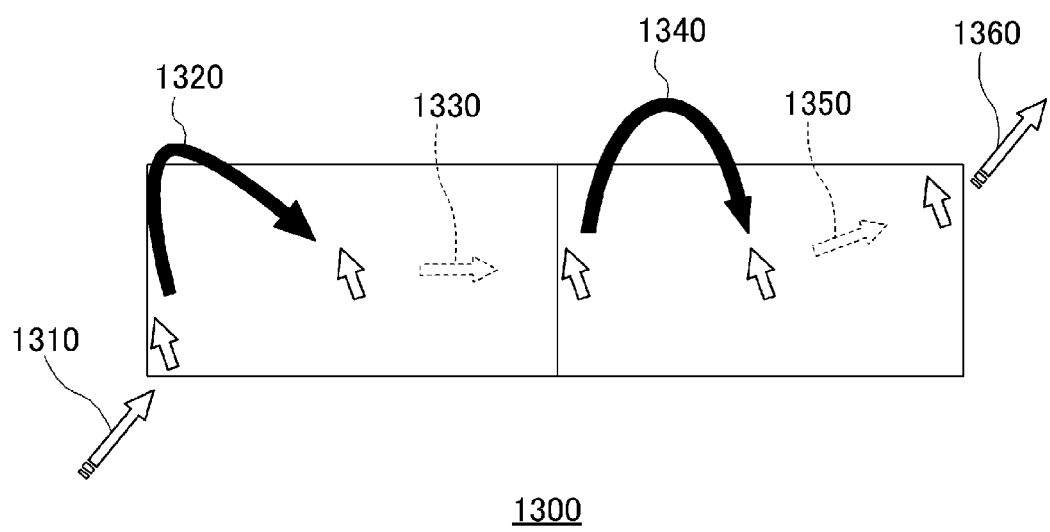
FIG. 13 is a diagram showing a display example of a third embodiment of the present invention carried out by the pointer controlling apparatus shown in FIG. 6.

An example of a screen display according to a third embodiment of the present invention is described below. FIG. 13, which is similar to the example of FIG. 10, shows behavior of a pointer in multiple selection areas. The behavior (arrows 1310, 1320, and 1330) of when the pointer moves into the selection area from outside the selection area on the left side of FIG. 13, reaches the center of the selection area, and moves to the boundary of the selection area on the right side is the same as that of FIG. 10 described above. If the pointer crosses over the boundary between two selection areas, the moving speed of the pointer increases again, and the pointer moves to the center of the selection area on the right side as indicated by an arrow 1340. Further, as with the above description of FIG. 10, an arrow 1350, which indicates speed when the pointer moves within the selection area starting from the center of the selection area on the right side, becomes slower than the pointer speed. In addition, first and second control mode setting conditions and behavior in the respective control modes are as described above.

Such various behaviors of the pointer may be set in advance as shown in Table 1 below, and may be stored in a storing apparatus 660. A pointer controlling apparatus 610 may implement a desired pointer's behavior by reading and executing a program specifying necessary behavior from the storing apparatus 660 according to form.

TABLE 1

| Behavior | Selection area coordinate(L1) | Central coordinate of the selection area (L0) | Moving speed threshold within the selection area (V1) | Moving speed of a pointer from L1 to L0 (V2) | Moving speed of a pointer from L0 to L1 (V3) | Pointer suspension duration (sec.) |
|---|---|---|---|---|---|---|
| 1 | X11, Y11<br>X21, Y21<br>X31, Y31<br>X41, Y41 | (X011, Y011) | (Vx11, Vy11) | (Vx21, Vy21) | (Vx31, Vy31) | 0 |
| 2 | X12, Y12<br>X22, Y22 | (X012, Y012) | (Vx12, Vy12) | (Vx22, Vy22) | (Vx32, Vy32) | t2 |

TABLE 1-continued

| Behavior | Selection area coordinate(L1) | Central coordinate of the selection area (L0) | Moving speed threshold within the selection area (V1) | Moving speed of a pointer from L1 to L0 (V2) | Moving speed of a pointer from L0 to L1 (V3) | Pointer suspension duration (sec.) |
|---|---|---|---|---|---|---|
| | X32, Y32 | | | | | |
| | X42, Y42 | | | | | |
| . | . | . | . | . | . | . |
| . | . | . | . | . | . | . |
| . | . | . | . | . | . | . |

For example, taking behavior 1 in Table 1 as an example, in the selection area including the boundary of the selection area specified by four points ((X11,Y11), (X12,Y12), (X13,Y13), (X14, Y14)), if the moving speed of the pointer within the selection area is less than a certain threshold (Vx11, Vy11), the first control mode is set. In this case, the moving speed of the pointer from the boundary of the selection area to the central coordinates of the selection area is set to (Vx21, Vy21), and the moving speed of the pointer from the center coordinates of the selection area to the boundary of the selection area is set to (Vx31, Vy31), respectively. As seen from the form of FIG. 12, it is possible to suspend the pointer's movement for a certain duration at the center of the selection area by setting pointer suspension duration (t2 seconds in the case of behavior 2). In addition, with the pointer controlling apparatus according to the present invention, all behavior condition settings described above may be applied, or may be selected according to the user's request or function or form of application software.

For those skilled in the art, the pointer controlling apparatus according to the present invention has a wide application range, and thus can be applied to any devices as long as the devices have a GUI function, such as game machines, information home electronics, televisions, car navigation systems, security systems, touch-panel type inputting devices, and the like, in addition to application software for computer using GUI, as is seen from the aforementioned description.

Although a plurality of embodiments of the present invention have been described in the above, the present invention is not limited to those embodiments. Further, it should be understood that effects described in the embodiments of the present invention are for illustrative purposes only, and the effects of the present invention are not limited to those described in the embodiments.

The invention claimed is:

1. A pointer controlling apparatus, comprising:
(a) means for receiving position information of a pointer from movement of a pointing device and determining whether the pointer has crossed over a boundary of a predetermined area from outside to inside;
(b) means for setting an operating mode of the pointer to a first control mode when a change in the position information of the pointer per unit time is less than a predetermined value, and setting the operating mode of the pointer to a second control mode when the change in the position information of the pointer per unit time is greater than or equal to the predetermined value;
(c) means for moving the pointer to a predetermined position within the predetermined area when in the first control mode and the pointer has crossed over the boundary of the predetermined area from outside to inside; and
per unit time of the pointer caused by the movement of the pointing device per unit time, when in the first control mode and the pointer is determined to exist within the predetermined area, compared to a moving distance per unit time of the pointer caused by the movement of the pointing device per unit time when the pointer existed outside the predetermined area.

2. The pointer controlling apparatus as set forth in claim 1, wherein when in the second control mode:
the apparatus does not move the pointer to the predetermined position within the predetermined area; and
the apparatus does not change the moving distance per unit time of the pointer caused by the movement of the pointing device per unit time regardless of the location of the pointer relative to the inside and the outside of the predetermined area.

3. The pointer controlling apparatus as set forth in claim 1, wherein the predetermined position within the predetermined area is the center of the predetermined area.

4. The pointer controlling apparatus as set forth in claim 1, wherein when the pointer has crossed over the boundary of the predetermined area from outside to inside, a display in the predetermined area is emphasized.

5. A pointer controlling apparatus, comprising:
(a) means for receiving position information of a pointer from movement of a pointing device and determining whether the pointer has crossed over a boundary of a predetermined area from outside to inside;
(b) means for setting an operating mode of the pointer to a first control mode when a predetermined event has not occurred, and setting the operating mode of the pointer to a second control mode when the predetermined event has occurred;
(c) means for moving the pointer to a predetermined position within the predetermined area when in the first control mode and the pointer has crossed over the boundary of the predetermined area from outside to inside; and
(d) means for changing a moving distance per unit time of the pointer caused by the movement of the pointing device per unit time, when in the first control mode and the pointer is determined to exist within the predetermined area, compared to a moving distance per unit time of the pointer caused by the movement of the pointing device per unit time when the pointer existed outside the predetermined area.

6. The pointer controlling apparatus as set forth in claim 5, wherein the predetermined event is at least one selected from the group comprising:
a clicking operation; and a dragging operation.

7. A pointer controlling method, comprising the steps of:
(a) receiving position information of a pointer from movement of a pointing device and determining whether the pointer has crossed over a boundary of a predetermined area from outside to inside;
(b) setting an operating mode of the pointer to a first control mode when a change in the position information of the pointer per unit time is less than a predetermined value, and setting the operating mode of the pointer to a second control mode when the change in the position information of the pointer per unit time is greater than or equal to the predetermined value;
(c) moving the pointer to a predetermined position within the predetermined area when in the first control mode and the pointer has crossed over the boundary of the predetermined area from outside to inside; and
per unit time of the pointer caused by the movement of the pointing device per unit time, when in the first control mode and the pointer is determined to exist within the predetermined area, compared to a moving distance per unit time of the pointer caused by the movement of the pointing device per unit time when the pointer existed outside the predetermined area.

8. A pointer controlling program executable by a computer to implement the steps comprising:
(a) receiving position information of a pointer from movement of a pointing device and determining whether the pointer has crossed over a boundary of a predetermined area from outside to inside;
(b) setting an operating mode of the pointer to a first control mode when a change in the position information of the pointer per unit time is less than a predetermined value, and setting the operating mode of the pointer to a second control mode when the change in the position information of the pointer per unit time is greater than or equal to the predetermined value;
(c) moving the pointer to a predetermined position within the predetermined area when in the first control mode and the pointer has crossed over the boundary of the predetermined area from outside to inside; and
per unit time of the pointer caused by the movement of the pointing device per unit time, when in the first control mode and the pointer is determined to exist within the predetermined area, compared to a moving distance per unit time of the pointer caused by the movement of the pointing device per unit time when the pointer existed outside the predetermined area.

9. A pointer controlling apparatus, comprising:
(a) means for receiving position information of a pointer from movement of a pointing device and determining whether the pointer has crossed over a boundary of a predetermined area from outside to inside;
(b) means for setting an operating mode of the pointer to a first control mode when a change in the position information of the pointer per unit time is less than a predetermined value, and setting the operating mode of the pointer to a second control mode when the change in the position information of the pointer per unit time is greater than or equal to the predetermined value;
changing a moving distance of the pointer, when in the first control mode and the pointer is determined to exist within the predetermined area, based on the change in the position information of the pointer per unit time determined when the pointer existed outside the predetermined area;
(c) means for increasing a moving distance per unit time of the pointer, when the pointer exists inside the boundary of the predetermined area and the pointer moves closer to a center of the predetermined area, based on the change in the position information of the pointer per unit time determined when the pointer existed outside the predetermined area when in the first control mode; and
(d) means for decreasing the moving distance per unit time of the pointer, when the pointer exists inside the boundary of the predetermined area and the pointer moves away from the center of the predetermined area, based on the change in the position information of the pointer per unit time determined when the pointer existed outside the predetermined area when in the first control mode.

10. A pointer controlling apparatus, comprising:
(a) means for receiving position information of a pointer from movement of a pointing device and determining whether the pointer has crossed over a boundary of a predetermined area from outside to inside;
(b) means for setting an operating mode of the pointer to a first control mode when a change in the position information of the pointer per unit time is less than a predetermined value, and setting the operating mode of the pointer to a second control mode when the change in the position information of the pointer per unit time is greater than or equal to the predetermined value;
(c) means for increasing a moving distance per unit time of the pointer, when it is determined that the pointer exists inside the boundary of the predetermined area and the pointer moves closer to a center of the predetermined area, based on the change in the position information of the pointer per unit time when the pointer existed outside the predetermined area when in the first control mode; and
(d) means for suspending movement of the pointer, when in the first control mode, the pointer exists inside the boundary of the predetermined area, and the pointer moves away from the center of the predetermined area, even when change in the position information of the pointer per unit time has occurred.

* * * * *